(12) United States Patent
Marupaduga et al.

(10) Patent No.: US 10,924,230 B1
(45) Date of Patent: Feb. 16, 2021

(54) AVOIDING OR CORRECTING INTER-CELL INTERFERENCE BASED ON AN AZIMUTHAL MODIFICATION

(71) Applicant: Sprint Communications Company L.P., Overland Park, KS (US)

(72) Inventors: Sreekar Marupaduga, Overland Park, KS (US); Andrew M. Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 412 days.

(21) Appl. No.: 15/796,197

(22) Filed: Oct. 27, 2017

(51) Int. Cl.
- *H04W 16/28* (2009.01)
- *H04L 5/00* (2006.01)
- *H01Q 3/30* (2006.01)
- *H01Q 3/28* (2006.01)
- *H04B 7/06* (2006.01)

(52) U.S. Cl.
CPC ............ *H04L 5/0032* (2013.01); *H01Q 3/28* (2013.01); *H01Q 3/30* (2013.01); *H04B 7/0617* (2013.01); *H04W 16/28* (2013.01)

(58) Field of Classification Search
CPC ...................................................... H04L 5/00
See application file for complete search history.

(56) References Cited

U.S. PATENT DOCUMENTS

| | | | |
|---|---|---|---|
| 2016/0211576 A1* | 7/2016 | Vassilakis | H01Q 3/08 |
| 2017/0265090 A1* | 9/2017 | Lee | H04L 29/04 |
| 2018/0020363 A1* | 1/2018 | Faxer | H04L 5/005 |

* cited by examiner

*Primary Examiner* — Michael T Vu

(57) ABSTRACT

Methods and systems are provided for dynamically adjusting beamforming weights based on an azimuthal change request. A proposed azimuth change of an antenna is received, such as at a base station, where the proposed azimuth change is for remote azimuth steering of the antenna. A potential inter-cell interference is determined based on the proposed azimuth change. Based on the potential inter-cell interference, it can be predicted whether the proposed azimuth change can be made. The response, as to whether or not the proposed azimuth change can be made or not, is communicated to the base station.

15 Claims, 6 Drawing Sheets

AVOIDING OR CORRECTING INTER-CELL INTERFERENCE BASED ON AN AZIMUTHAL MODIFICATION

SUMMARY

The present disclosure is directed, in part, to methods and systems for dynamically changing beamforming weights to mitigate inter-cell interference caused by an azimuth change of an antenna at a cell site. Azimuth changes may be made by remote azimuth steering to change coverage of a beamform for a particular antenna. In some aspects, after an azimuth change has been made, a network component may determine if that change has caused significant interference with signals from a neighboring cell site. If so, beamforming weights may be altered to reduce inter-cell interference, which may cause a higher weighting loss (e.g., decrease in signal quality as measured by a user device). However, the higher weighting loss may be acceptable because of the lower inter-cell interference. In some instances, the azimuth change may not be made until a network component has determined a potential inter-cell interference. In this case, if it is determined that inter-cell interference could be too high, and thus unacceptable to the network, that network component may either determine that the azimuth change not be made, or could recommend beamforming weight modifications to mitigate the potential inter-cell interference.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
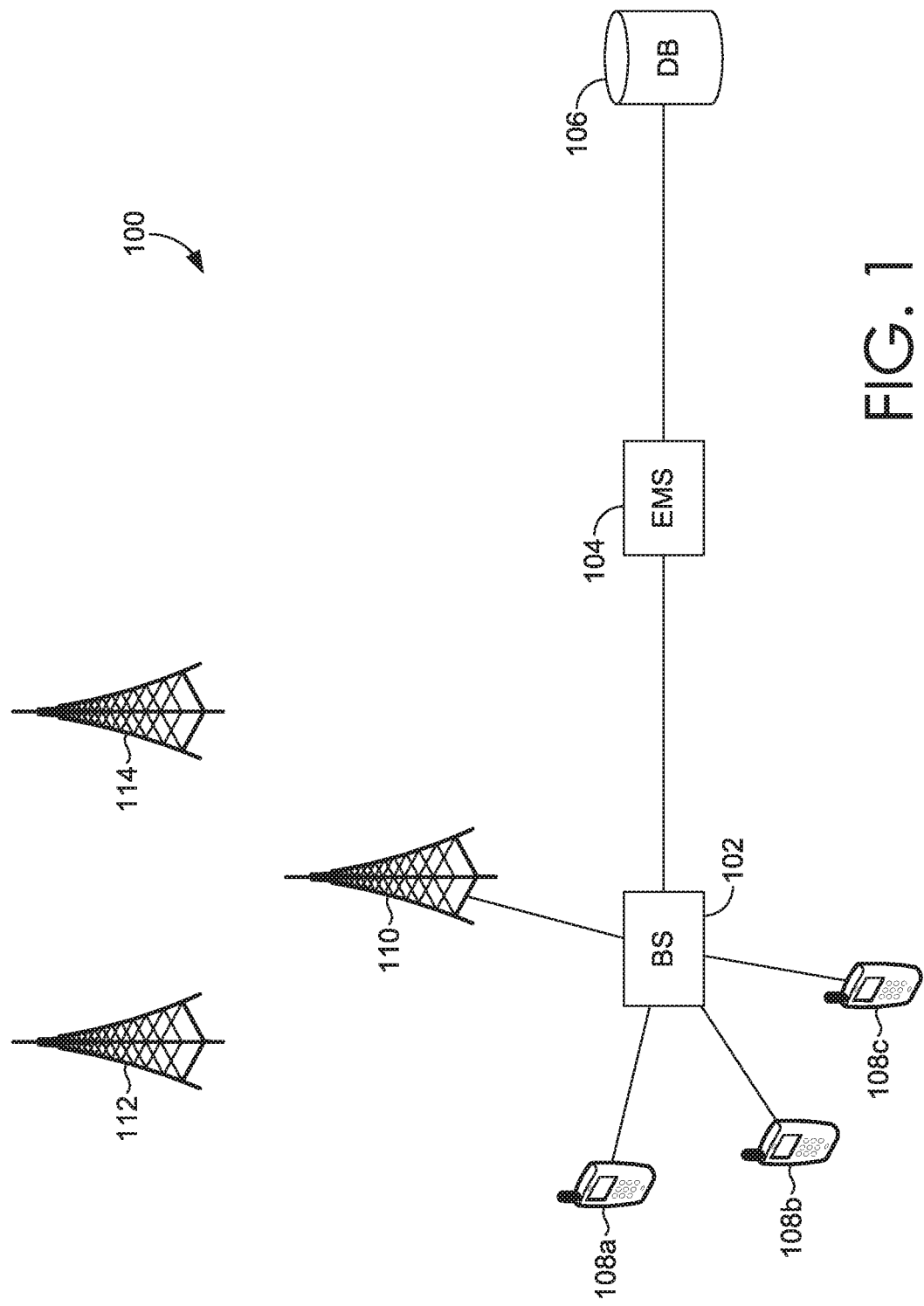
FIG. 1 depicts a diagram of an exemplary operating environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In certain aspects, methods are provided for dynamically modifying beamforming weights for an antenna at a cell site based, for example, on a proposed or already made azimuth change. Embodiments described herein may be utilized for antennas with beamforming capabilities. For instance, remote azimuth steering may be used to modify the azimuth of one or more antennas at a cell site. Currently, in many beamforming systems, beamforming weights are set based on coverage needs. For example, an azimuth change may be made to provide better coverage to one or more mobile devices within that cell site's coverage area. An azimuth, as used herein, refers to the direction of an antenna around a vertical axis. As such, when the azimuth of an antenna is changed, the antenna is physically moved in a particular horizontal direction. The amount of rotation of the antenna depends on the degree of the azimuth change. Remote azimuth steering is becoming more increasingly used, and at least partially because of this, antennas at cell sites may incur more azimuth changes than were made previously, in part, to both meet coverage needs and to mitigate inter-cell interference.

Aspects described herein provide a mechanism to dynamically adjust the broadcast beamforming weights to address azimuthal changes and/or inter-cell interference. There are two implementations that will be described herein. The first is a proactive approach whereby potential inter-cell interference is analyzed prior to an azimuth change. The second is a reactive approach whereby an azimuth change is made, and then the inter-cell interference is measured to determine how beamforming weights should be modified to mitigate at least some of the inter-cell interference.

In some aspects described herein and as mentioned above, the azimuth change may be a proposed change, and may not be made until it has been determined that inter-cell interference will not be increased above a threshold, and thus is tolerable by the network and user devices. In this aspect, a base station may receive an indication, such as from another network component, that a request has been made to change the azimuth of a particular antenna at that cell site. The base station may then request from an element management system (EMS) or some other network component to make a determination as to the potential inter-call interference if the proposed azimuth change is made. The EMS may make this determination by, for example, determining which cell sites are neighboring to the cell site that has the request for an azimuth change. Signal information associated with those neighboring cell sites can be used to determine any potential inter-cell interference that may occur if the azimuth change is made. The EMS may also determine that if the azimuth change is made, how the beamforming weights can be modified to mitigate at least some of the potential inter-cell interference. Stated differently, even if potential inter-cell interference is determined to be above a threshold amount that is considered unacceptable, there could be a way to modify the beamforming weights so that the proposed azimuth change can still be made.

In other embodiments, as mentioned above, the azimuth of the antenna may be changed before potential inter-cell interference is considered. As such, after the azimuth change has been made, the base station (e.g., eNodeB) will be notified of the change and inter-cell interference is analyzed. The EMS may be the network component that looks at interference to determine if beamforming weights should be changed. Generally, if inter-cell interference is determined to be high, which could be above a range or value that is acceptable in the network, beamforming weights are set in such a way that weighting loss is high. This would reduce any significant overlap of the coverage areas of the neighboring cell sites. But if inter-cell interference is determined to be low, such as lower than a range or value that is acceptable in the network, beamforming weights may be set so that weighing loss is low. When weighting loss is high, which is from the perspective of a user device, signal quality may not be optimal.

One goal of the aspects described herein is to mitigate inter-cell interference by altering beamforming weights. For instance, when inter-cell interference is determined to be too high, beamforming weights are altered so that weighting loss is high, or least is increased from its value prior to the change in beamforming weights. Effectively, when weighting loss is increased as a result of a change in beamforming weights, the signal quality as measured by the one or more user devices that are being covered by the beamform may have lowered from where it was previously. This will further be described herein.

In a first aspect, one or more computer-readable media having computer-executable instructions embodied thereon are provided that, when executed, perform a method for dynamically adjusting beamforming weights based on a azimuthal change request. The method comprises receiving, from a base station, a proposed azimuth change of an antenna from remote azimuth steering of the antenna, and determining a potential inter-cell interference based on the proposed azimuth change. Further, the method comprises, based on the determined potential inter-cell interference, predicting whether the proposed azimuth change can be made, and communicating a response to the proposed azimuth change, based on the prediction, to the base station.

In another aspect, a method for dynamically adjusting beamforming weights based on measured inter-cell interference is provided. The method comprises receiving a notification that inter-cell interference at a cell site has been measured as being outside a predetermined range, and based on the notification, dynamically adjusting beamforming weights associated with at least one antenna of the cell site, wherein adjusting the beamforming weights adjusts one or more of a phase or an amplitude. The method also comprises applying the dynamically adjusted beamforming weights to the at least one antenna of the cell site.

In yet another aspect, a dynamic beamforming system for dynamically adjusting beamforming weights based on remote azimuthal steering is provided. The dynamic beamforming system comprises a processor and one or more computer storage hardware devices storing computer-usable instructions that, when used by the processor, cause the processor to perform a method. The method includes to determine that an azimuth of at least one antenna at a cell site has been changed, and based on the azimuth change, determine that interference associated with the cell site is outside a predetermined range. If the interference associated with the cell site is above the predetermined range, the method includes to adjust beamforming weights of the at least one antenna such that weighting loss increases relative to its value prior to the azimuth change. If the interference associated with the cell site is below the predetermined range, the method includes to adjust the beamforming weights of the at least one antenna such that the weighting loss decreases relative to its value prior to the azimuth change.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes base station 102, element management system (EMS), database 106, and user devices 108a, 108b, and 108c. Base station 102 is associated with cell site 110, which may include a cell tower and other network components used to communicate and receive signals from mobile device and other cell sites to provide coverage for user devices in the coverage area. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

Figure 6:
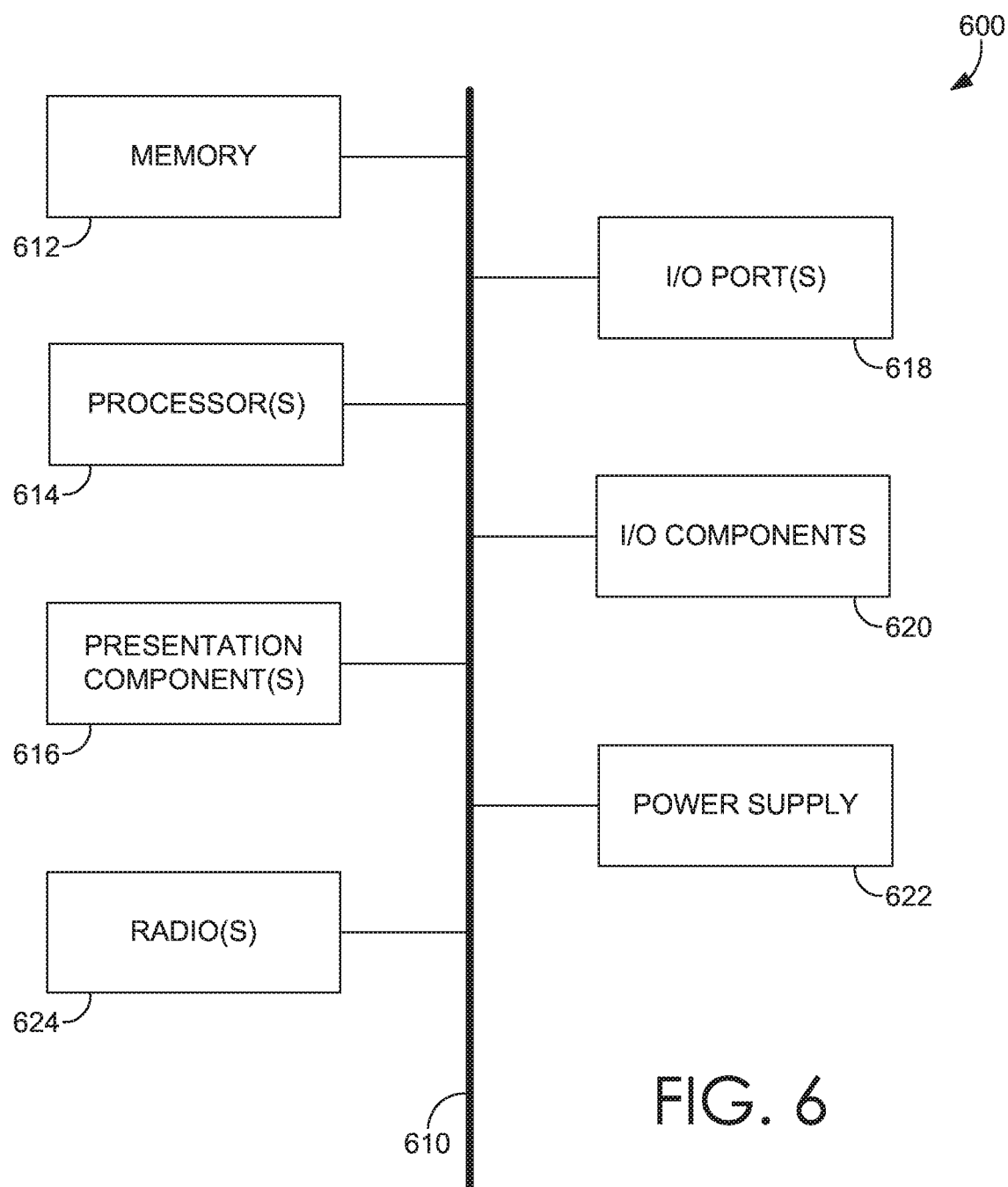
FIG. 6 depicts a diagram of an exemplary computing environment suitable for use in implementations of the present disclosure.

In some aspects, the user devices 108a, 108b, and 108c can correspond to computing device 600 in FIG. 6. Thus, a user device can include, for example, a display(s), a power source(s) (e.g., a battery), a data store(s), a speaker(s), memory, a buffer(s), a radio(s) and the like. In some implementations, a user device 108a, 108b, and 108c comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices 108a, 108b, and 108c in network environment 100 can optionally utilize a network (not specifically shown) to communicate with other user devices (e.g., a mobile device(s), a server(s), a personal computer(s), etc.) through cell site 110. The network may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. The network can include multiple networks, as well as being a network of networks, but is shown in more simple form so as to not obscure other aspects of the present disclosure.

A network can be part of a telecommunication network that connects subscribers to their immediate service provider. In some instances, a network can be associated with a telecommunications provider that provides services (e.g., LTE) to user devices, such as user devices 108a, 108b, and 108c. For example, the network may provide voice services to user devices or corresponding users that are registered or subscribed to utilize the services provided by a telecommunications provider. The network can comprise any communication network providing voice and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, cell site 110 and its associated base station 102 is configured to communicate with user devices, such as user devices 108a, 108b, and 108c that are located within the geographical area, or cell, covered by radio antennas of cell site 110. Cell site 110 may include one or more base stations, base transmitter stations, radios, antennas, transmitters/receivers, digital signal processors, control electronics, GPS equipment, and the like. In particular, cell site 110 may selectively communicate with the user devices using beamforming. In general, beamforming is a signal processing technique for directional signal transmission or reception. When it is desired to change the directionality of an array when transmitting radio frequency signal from an antenna at a cell site, a beamformer controls the phase and relative amplitude of the signal at each transmitter.

In general, when beamforming is utilized at a particular cell site, beamforming weights are set based on coverage needs. Beamforming weights are adjusted by adjusting the phase and amplitude of signals at each transmitter. In typical implementations, beamforming weights are occasionally reset. However, with the use of remote azimuthal steering (RAS), which can be implemented on the EMS, there is a high probability that more azimuthal changes in networks will occur to meet coverage needs and to mitigate inter-cell interference, which is the interference between two or more cell sites. For example, cell site 110 may include a first set of antennas. These antennas, when transmitting signals, may not initially interfere with signals transmitted by other antennas at, for example, cell sites 112 and 114, which are neighboring cell sites to cell site 110. However, as a user device moves within cell site's 100 coverage area, the beamform from cell site 110 may move and eventually interfere with beamforms from cell sites 112 and/or 114.

In some embodiments, base station 102 may be notified by another network component that there will be an azimuthal change. This could occur prior to the azimuthal change takes effect, and thus is a proposed azimuthal change. In this embodiment, base station 102 may send this information to the EMS 104, for EMS 104 to run logic to determine whether the change in azimuth will cause any significant interference between cells. For example, logic and other data used by EMS 104 may be stored in database 106. In some cases, EMS 104 may be able to run a corrective action with adjacent cell sites prior to the azimuth change. In other cases, EMS 104 may respond to base station 102 with approval as to whether the requested azimuth change can be made or not. If inter-cell interference cannot properly be mitigated and the interferences is above a threshold, for example, EMS 104 may indicate to base station 102 that the azimuthal change should not be made. However, if inter-cell interference is not deemed by EMS 104 to be a significant issue if the azimuthal change is made, EMS 104 may indicate to base station 102 that the azimuthal change can be made.

In other embodiments, an azimuthal change may be made prior to EMS 104 determining that inter-cell interference may pose an issue. In this case, based on the increase in inter-cell interference and the change in azimuth, the beamforming weight factors are decided. For instance, if inter-cell interference is high, beamforming weights are set in such a way that the weighting loss is high. This would then reduce any significant overlap of the coverage areas of the two cell sites, such as cell site 110 and 112, or cell site 110 and 114. Alternatively, if inter-cell interference is low, beamforming weights are set such that weighting loss is low. As used herein, weighting loss refers to a signal quality, as measured by the user device. This relationship between inter-cell interference and weighting loss will become more apparent in subsequent figures.

Figure 2A:
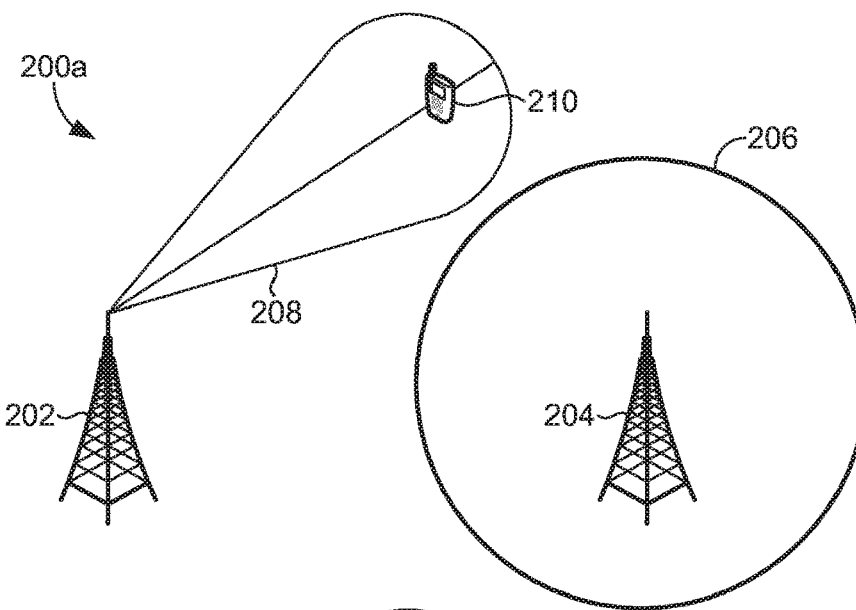
FIGS. 2A, 2B, and 2C are diagrams illustrating the effects of modifying the beamforming weights based on azimuthal changes and inter-cell interference, in accordance with implementations of the present disclosure.
Figure 2B:
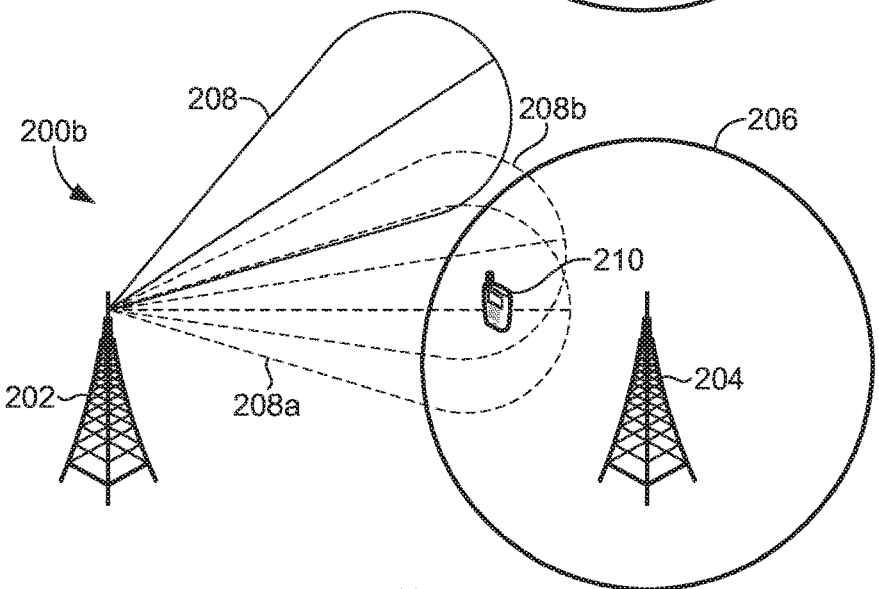
Figure 2C:
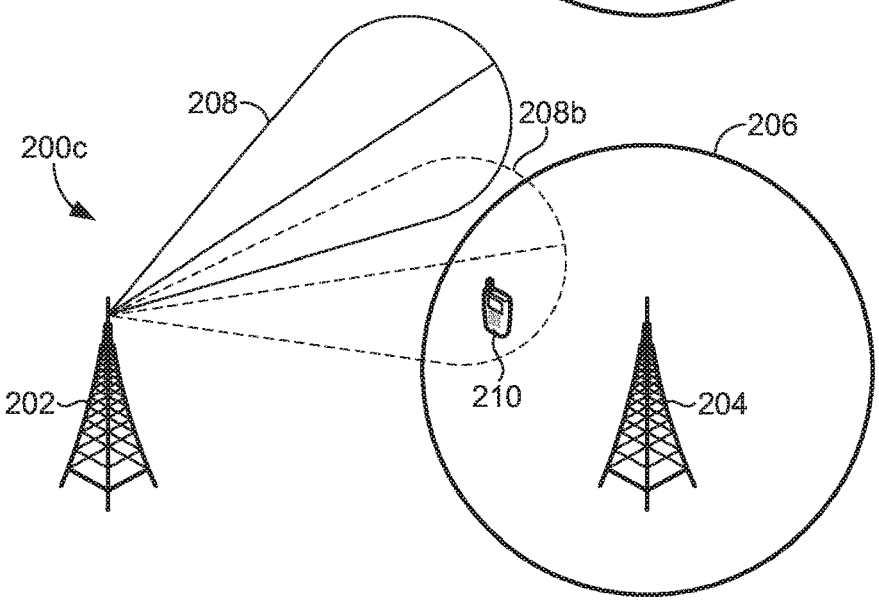

FIGS. 2A, 2B, and 2C are diagrams illustrating the effects of modifying the beamforming weights based on azimuthal changes and inter-cell interference, in accordance with implementations of the present disclosure. For each of these figures, it is noted that the illustrated beams are broadcast beams, not service beams. As such, the broadcast beams are shown as being moved from a first position to a second position. When we say that beamforming weights are changed, beamforming weights of the broadcast beams are being modified. Referring initially to FIG. 2A, referred to herein as exemplary operating environment 200a, a cell site 202 is illustrated having a beamform 208 that covers a user device 210, such that user device 210 receives optimal signal from cell site 202, being that it is directly in the center of beamform 208. Cell site 204 is also illustrated having a general coverage area of 206. Because, in FIG. 2A, there is no overlap in beamform 208 and coverage area 206, inter-cell interference is non-existent or at least minimal. Moving on to FIG. 2B, an azimuthal change has been made to one or more antennas at cell site 202. As such, beamform 208 from FIG. 2A has now moved to a first position, shown by beamform 208a in FIG. 2B after an azimuthal change, which changes the direction of a beamform (based on a change in phase and amplitude). Mobile device 210 has moved from a first location in FIG. 2A to a second location in FIG. 2B. In FIG. 2B, generally referred to herein as exemplary operating environment 200b, beamform 208a provides great coverage for mobile device 210, as mobile device 210 is located in the center of beamform 208a.

At this point, once the azimuthal change has been made, the base station, along with the EMS, may determine that the change in azimuth has caused inter-cell interference to increase between cell site 202 and cell site 204, as at least partially indicated by the heavy overlap between beamform 208a and coverage area 206. The EMS may then determine that a correct action should be taken to lessen the inter-cell interference from the azimuthal change. The EMS may determine how the beamforming weights should be changed, and provide this information to the base station for implementation. As mentioned above, if inter-cell interference is high, beamforming weights are set in such a way that the weighting loss is high. This would then reduce any significant overlap of the coverage areas of the two cell sites, such as cell site 202 and 204. Alternatively, if inter-cell interference is low, beamforming weights are set such that weighting loss is low. In FIG. 2B, it may be determined by the EMS that inter-cell interference is high between beamform 208a and coverage area 206, and as such, correct action is taken to move the beamform to a different position, such as the position of beamform 208b of FIG. 2. Mobile device 210 is not centered within beamform 208b, and as such, weighting loss may be higher than when beamform 208a is used, but inter-cell interference is lower than it was with beamform 208a. Generally, a high weighting loss indicates that the signal to/from the mobile device 210 from cell site 202 may not be as strong as it would be otherwise, such as when the mobile device 210 is centered within a beamform and receives a stronger signal. As such, with beamform 208b, the mobile device 210 is located near the side/edge of beamform 208b, such that signal reception is not as strong (high weighting loss), but inter-cell interference is lowered.

FIG. 2C, referred to herein as exemplary operating environment 200c, illustrates the outcome of the processes described here, where it was determined that inter-cell interference was higher than a threshold after an azimuthal change. Thus, EMS or another network component changed beamforming weights to increase weighing loss (e.g., the strength of the signal to mobile device 210 has decreased), but also to decrease inter-cell interference.

Figure 3:
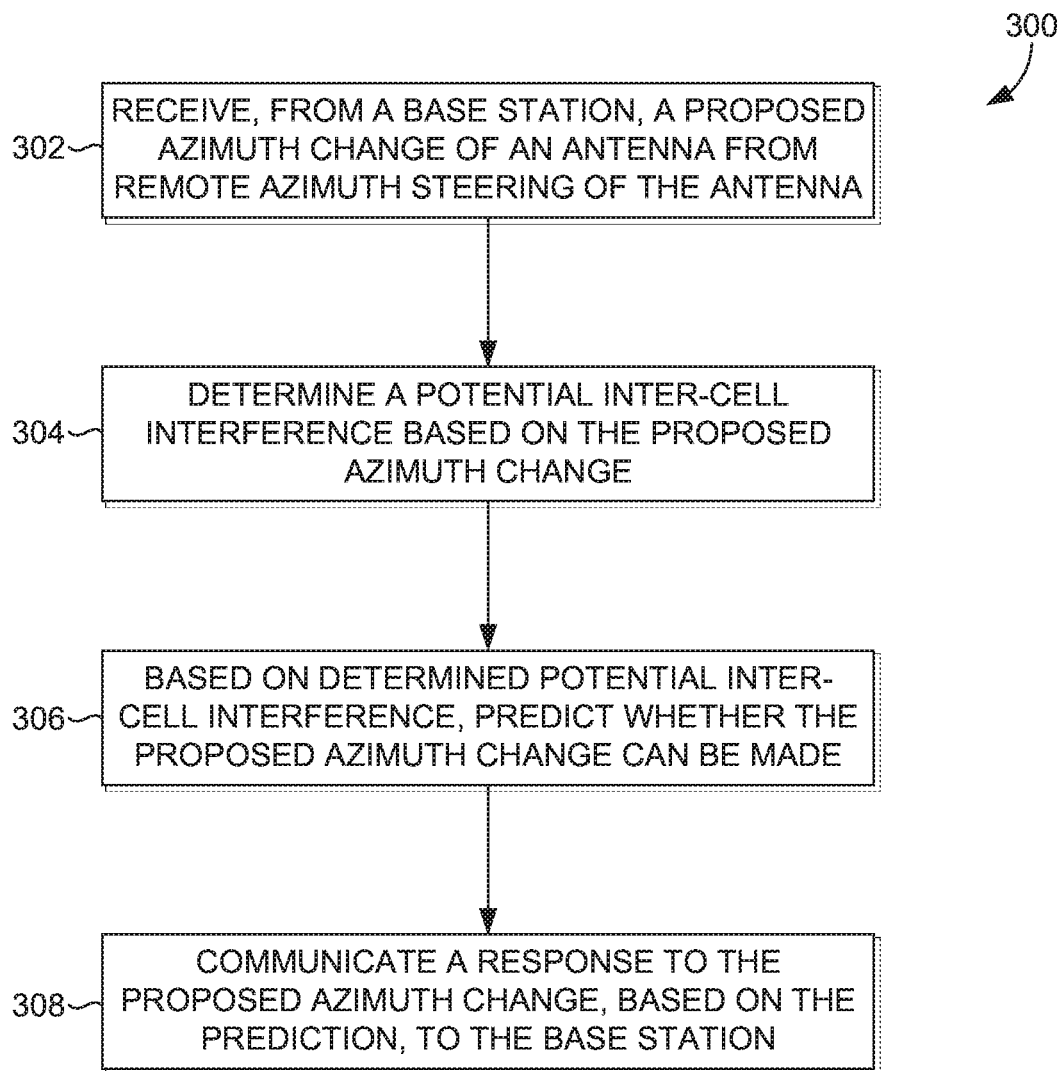
FIG. 3 depicts a flow diagram of an exemplary method for dynamically adjusting beamforming weights based on a azimuthal change request, in accordance with implementations of the present disclosure.

FIG. 3 depicts a flow diagram of an exemplary method 300 for dynamically adjusting beamforming weights based on a azimuthal change request, in accordance with implementations of the present disclosure. Method 300 represents the implementation where the azimuth change is not made until the EMS has analyzed potential inter-cell interference that could be present as a result of the azimuth change. This is a proactive approach to an azimuth change. Initially, at block 302, a proposed azimuth change of an antenna is received from a base station associated with that antenna. In some embodiments, the proposed azimuth change would be made by way of remote azimuth steering, which is done remote from the antenna, or even from the base station. At block 304, a potential inter-cell interference is determined based on the proposed azimuth change. In embodiments, when an azimuthal change is proposed, the base station may send an indication of this to the EMS for evaluation. The EMS may then determine how the azimuthal change will effect inter-cell interference. The EMS may use logic to make this determination. For example, the EMS may identify one or more cell sites that are neighboring to the subject cell cite, where the proposed azimuthal change is to be made. The EMS can then determine the current coverage areas or direction of beamforms for the antennas at the neighboring cell sites. In some instances, the base stations at the neighboring cell sites may be queried for this information. The EMS can then determine if and how much inter-cell interference may occur if the azimuthal change is made.

At block 306, the EMS predicts, based on the determined potential inter-cell interference at block 304, whether the proposed azimuthal change can be made. In some embodiments, there is a threshold amount of inter-cell interference that is determined before the EMS makes the determination that the azimuthal change should not be made. For example, if the predicted inter-cell interference is above a predetermined threshold, and thus the amount of inter-cell interference is determined not to be acceptable, the recommendation or direction from the EMS may be to not make the proposed azimuth change. But if the predicted inter-cell interference is below the predetermined threshold, and thus the amount of inter-cell interference is determined to be acceptable, the recommendation or direction from the EMS may be for the proposed azimuth change to be made. At block 308, a response to the proposed azimuth change is communicated to the base station, based on the prediction of the inter-cell interference.

Figure 4:
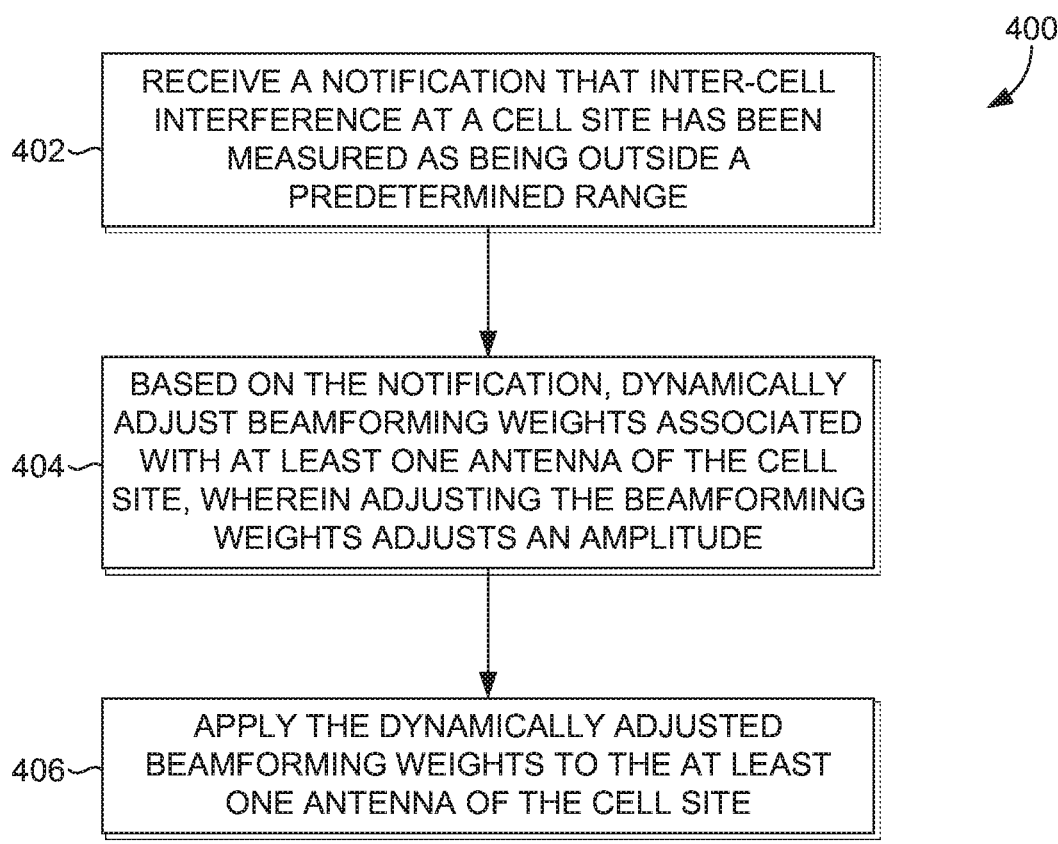
FIG. 4 depicts a flow diagram of an exemplary method for dynamically adjusting beamforming weights based on measured inter-cell interference, in accordance with implementations of the present disclosure.

FIG. 4 depicts a flow diagram of an exemplary method 400 for dynamically adjusting beamforming weights based on measured inter-cell interference, in accordance with implementations of the present disclosure. The implementation of method 400 is reactive, such that the azimuthal change has been made, and then it is determined how inter-cell interference was effected by the change. At block 402, a notification is received that inter-cell interference at a cell site has been measured as being outside a predetermined range. For instance, the may be a range, or a value, above which inter-cell interference is unacceptable. Too much inter-cell interference causes a drop in call quality and poor signal for the user. If a range is utilized, the inter-cell interference could also be below the range, and thus is acceptable and does not pose an issue. In one implementation, the notification is received from at a base station, such as at an eNodeB, but in another implementation, the notice is received at the EMS. At block 404, based on the notification that inter-cell interference is outside a predetermined range, beamforming weights associated with at least one antenna of the cell site are dynamically adjusted. In embodiments, beamforming weights are defined by, at least, a phase and amplitude. When one or more of phase and amplitude are adjusted, beamforming weights are adjusted. Effectively, when beamforming weights are adjusted, the beamform emitted from an antenna is shifted to a different location, as shown in FIGS. 2A, 2B, and 2C. In one aspect, if the inter-cell interference is higher than a predetermined range or value such that it is unacceptable, the amplitude of the beamform may be decreased when the beamforming weights are adjusted. Generally, weighting loss is high when inter-cell interference is high, as the signal quality, as measured by the user device, may be poor when interference is high. But, if the inter-cell interference is lower than the predetermined range or value, the amplitude is increased. In this case, weighting loss is low. At block 406, the dynamically adjusted beamforming weights are applied to the at least one antenna of the cell site.

Figure 5:
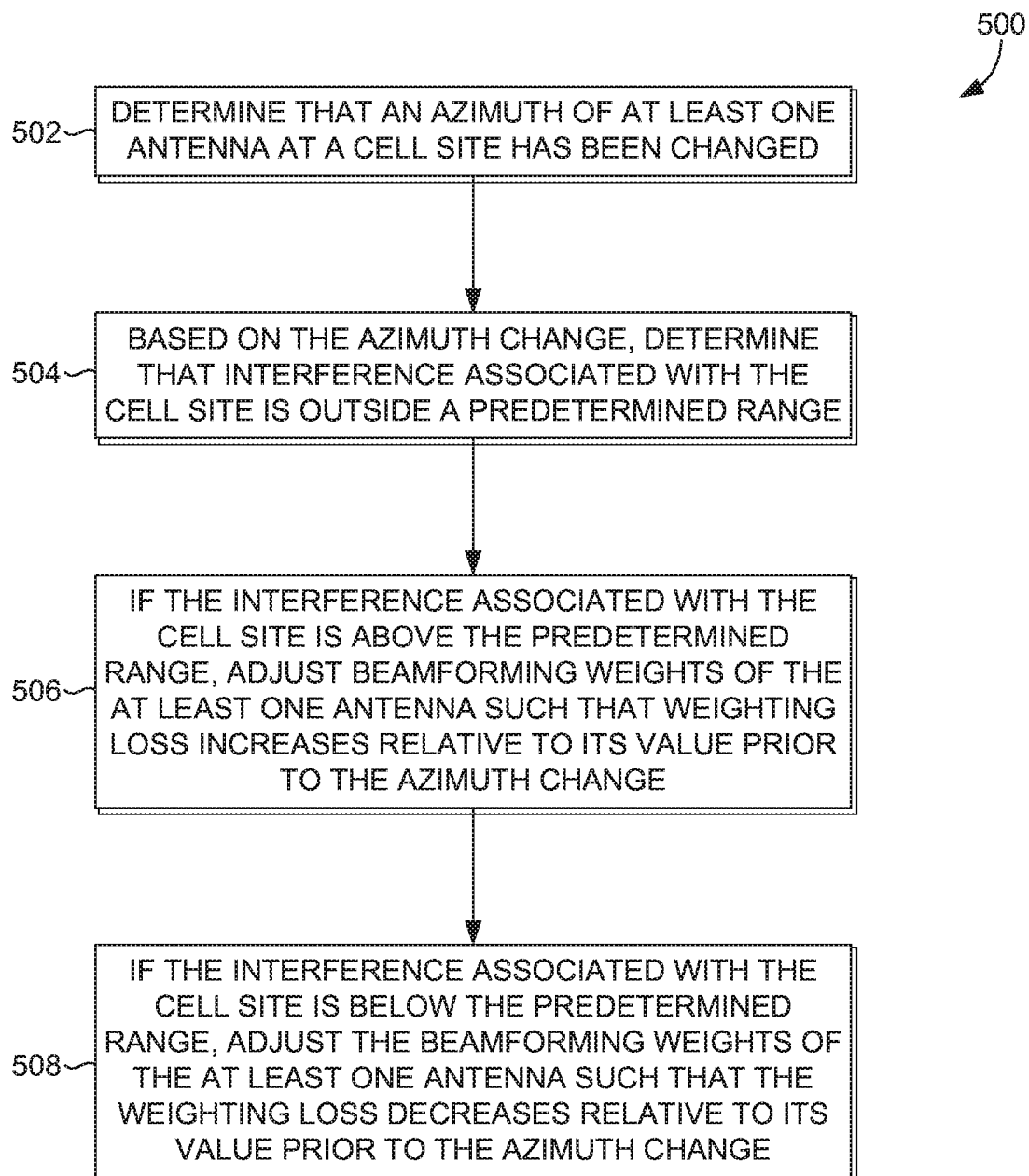
FIG. 5 depicts a flow diagram of an exemplary method for dynamically adjusting beamforming weights based on remote azimuthal steering, in accordance with implementations of the present disclosure.

FIG. 5 depicts a flow diagram of an exemplary method 500 for dynamically adjusting beamforming weights based on remote azimuthal steering, in accordance with implementations of the present disclosure. At block 502, it is determined that an azimuth of at least one antenna (e.g., an antenna that is beam-forming enabled) at a cell site has been changes. In some implementations, the azimuth change is caused by remote azimuth steering of the antenna. At block 504, based on the azimuth change, it is determined that interference associated with a signal from the antenna is outside a predetermined range. For instance, the signal from an antenna of another cell site may be interfering with the signal from the antenna whose azimuth has just been changed. In many cases, the interference (e.g., inter-cell interference) may be measured as being above a range or value, such that the level of interference is not acceptable. At block 506, it is determined that interference associated with the cell site is above the predetermined range. In this case, beamforming weights of the antenna are adjusted to increase weighting loss relative to its value prior to the azimuth change. However, as shown at block 508, if interference associated with the cell site is below the predetermined range, beamforming weights of the antenna are adjusted to decrease weighting loss relative to its value prior to the azimuth change. In other cases, if interference is low, no action may be taken subsequent to the azimuth change.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples the following devices: memory 604, one or more processors 606, one or more presentation components 608, input/output (I/O) ports 610, I/O components 612, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 606 that read data from various entities such as bus 602, memory 604 or I/O components 612. One or more presentation components 608 presents data indications to a person or other device. Exemplary one or more presentation components 608 include a display device, speaker, printing component, vibrating component, etc. I/O ports 610 allow computing device 600 to be logically coupled to other devices including I/O components 612, some of which may be built in computing device 600. Illustrative I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for dynamically adjusting beamforming weights based on a azimuthal change request, the method comprising:
   receiving, from a first base station, an indication that a first antenna is configured in a first orientation having a first azimuth and is transmitting a first set of signals to a first coverage area;
   receiving, from a second base station, an indication that one or more antennas of the second base station are transmitting a second set of signals to a second coverage area;
   receiving, from a the first base station, a proposed configuration for the first antenna, the proposed configuration comprising the first antenna in a second orientation and having a second azimuth, wherein transmitting the first set of signals would correspond to a third coverage area;
   prior to the first base station transmitting the first set of signals to the third coverage area, predicting a potential inter-cell interference based on the second coverage area and the third coverage area; and
   based on the determined potential inter-cell interference exceeding a predetermined threshold, communicating a response to the first base station.

2. The one or more non-transitory computer-readable media of claim 1, further comprising dynamically adjusting beamforming weights of the antenna based on the determination.

3. The one or more non-transitory computer-readable media of claim 1, wherein the base station determines the potential inter-cell interference.

4. The one or more non-transitory computer-readable media of claim 1, wherein an element management system determines the potential inter-cell interference.

5. The one or more non-transitory computer-readable media of claim 1, further comprising:
   determining that the potential inter-cell interference is above a predetermined threshold; and
   adjusting beamforming weights of the antenna such that a weighting loss is high relative to its value prior to the azimuth change being made.

6. The one or more non-transitory computer-readable media of claim 1, further comprising:
   determining that the potential inter-cell interference is below a predetermined threshold; and
   adjusting beamforming weights of the antenna such that a weighting loss is low relative to its value prior to the azimuth change being made.

7. The one or more non-transitory computer-readable media of claim 1, wherein the base station is an eNodeB.

8. A method for dynamically adjusting beamforming weights based on a azimuthal change request, the method comprising:
   receiving, from a first base station, an indication that a first antenna is configured in a first orientation having a first azimuth and is transmitting a first set of signals to a first coverage area;
   receiving, from a second base station, an indication that one or more antennas of the second base station are transmitting a second set of signals to a second coverage area;
   receiving, from a the first base station, a proposed configuration for the first antenna, the proposed configuration comprising the first antenna in a second orientation and having a second azimuth, wherein transmitting the first set of signals would correspond to a third coverage area;
   prior to the first base station transmitting the first set of signals to the third coverage area, predicting a potential inter-cell interference based on the second coverage area and the third coverage area; and
   based on the determined potential inter-cell interference exceeding a predetermined threshold, communicating a response to the first base station.

9. The method of claim 8, further comprising dynamically adjusting beamforming weights of the antenna based on the determination.

10. The method of claim 8, wherein the base station determines the potential inter-cell interference.

11. The method of claim 8, wherein an element management system determines the potential inter-cell interference.

12. The method of claim 8, further comprising:
    determining that the potential inter-cell interference is above a predetermined threshold; and
    adjusting beamforming weights of the antenna such that a weighting loss is high relative to its value prior to the azimuth change being made.

13. The method of claim 8, further comprising:
    determining that the potential inter-cell interference is below a predetermined threshold; and
    adjusting beamforming weights of the antenna such that a weighting loss is low relative to its value prior to the azimuth change being made.

14. The method of claim 8, wherein the base station is an eNodeB.

15. A system for dynamically adjusting beamforming weights based on a azimuthal change request, the system comprising:
- a first base station;
- a second base station;
- one or more computer processing components configured to perform a method, based on the execution of computer-executable instructions, for dynamically adjusting beamforming weights based on a azimuthal change request, the method comprising:
  - receiving, from the first base station, an indication that a first antenna is configured in a first orientation having a first azimuth and is transmitting a first set of signals to a first coverage area;
  - receiving, from the second base station, an indication that one or more antennas of the second base station are transmitting a second set of signals to a second coverage area;
  - receiving, from a the first base station, a proposed configuration for the first antenna, the proposed configuration comprising the first antenna in a second orientation and having a second azimuth, wherein transmitting the first set of signals would correspond to a third coverage area;
  - prior to the first base station transmitting the first set of signals to the third coverage area, predicting a potential inter-cell interference based on the second coverage area and the third coverage area; and
  - based on the determined potential inter-cell interference exceeding a predetermined threshold, communicating a response to the first base station.

* * * * *